United States Patent
Deng

(10) Patent No.: US 7,970,805 B2
(45) Date of Patent: Jun. 28, 2011

(54) DATA MANAGING METHOD IN A REMOVABLE STORAGE DEVICE

(75) Inventor: Guoshun Deng, Shenzhen (CN)

(73) Assignee: Netac Technology Co., Ltd., Nanshan District, Shenzhen, Guangdong (CN)

( * ) Notice: Subject to any disclaimer, the term of this patent is extended or adjusted under 35 U.S.C. 154(b) by 1097 days.

(21) Appl. No.: 10/579,577

(22) PCT Filed: Nov. 19, 2004

(86) PCT No.: PCT/CN2004/001320
§ 371 (c)(1),
(2), (4) Date: Apr. 26, 2007

(87) PCT Pub. No.: WO2005/050452
PCT Pub. Date: Jun. 2, 2005

(65) Prior Publication Data
US 2008/0040358 A1 Feb. 14, 2008

(30) Foreign Application Priority Data

Nov. 21, 2003 (CN) .......................... 2003 1 0115102

(51) Int. Cl.
*G06F 17/30* (2006.01)
(52) U.S. Cl. ........................................ 707/823; 707/824
(58) Field of Classification Search .................. 707/823, 707/824
See application file for complete search history.

(56) References Cited

U.S. PATENT DOCUMENTS

| 5,267,242 | A  | * | 11/1993 | Lavallee et al. | 714/7 |
| 5,812,414 | A  | * | 9/1998  | Butts et al.    | 716/16 |
| 6,182,159 | B1 | * | 1/2001  | Urabe           | 710/2 |
| 2004/0010654 | A1 | * | 1/2004 | Yasuda et al. | 711/1 |
| 2005/0223243 | A1 | * | 10/2005 | Moore et al. | 713/193 |
| 2006/0236064 | A1 | * | 10/2006 | Niles et al. | 711/170 |

FOREIGN PATENT DOCUMENTS

| CN | 1403921 | 9/2002 |
| CN | 1405780 | 3/2003 |
| CN | 2510905 | 3/2003 |
| EP | 0613 151 | 8/1994 |

OTHER PUBLICATIONS

International Search Report in PCT/CN2004/001320.

* cited by examiner

*Primary Examiner* — Shahid A Alam
*Assistant Examiner* — Dennis Myint
(74) *Attorney, Agent, or Firm* — Polsinelli Shughart PC; Timothy J. Keefer; Paul A. Jenny

(57) ABSTRACT

The invention provides a method for managing the data in the removable storage device. The method includes: applying or organizing or establishing or re-building the file managing system of the storage medium of said removable storage device according to the uses of said memory chips; and utilizing said file managing system to perform the corresponding processing in said memory chips according to the operation instructions of the host system, which is connected with said file managing system. By applying the method for managing the data in the removable storage device, which the invention provides, the capacity of the removable storage device can be extended, and the storage medium can be updated, thus the data security, the functions and the convenience of the system are increased.

12 Claims, 5 Drawing Sheets

| serial number of chips | encryption algorithm | encryption key | other information |
|---|---|---|---|
| 1 | | | |
| 2 | | | |
| ⋮ | ⋮ | ⋮ | ⋮ |
| N | | | |

DATA MANAGING METHOD IN A REMOVABLE STORAGE DEVICE

TECHNICAL FIELD

The present invention relates to data storage, and more particularly, to a data managing method for a removable storage device, which includes a plurality of memory chips and is able to increase, decrease and replace the memory chips.

BACKGROUND OF THE PRIOR ART

Presently, removable storage devices using storage medium for data storage are widely used. However, because of the technical limitation, most of the current removable storage devices are only provided with the storage medium having limited storage capacity, which is encapsulated in chips and is not removable. If there is a need of large data storage and transfer exceeding the storage capacity, the removable storage device should be replaced or new removable storage device should be purchased. In addition, if any part in the removable storage device is damaged, the whole removable storage device including undamaged controller, memory chips etc. will be discarded, and the data of the user would be lost in case that the memory chips are still in good condition. The two aspects of disadvantages limit the application of the removable storage device, resulting in the inconvenience in use and wastes, and also affect the user in data security.

The Chinese patent application entitled "Attachment Apparatus for Storage Medium and Removable Storage Device Using the Same" (Chinese Patent Application No. 03159669.X) discloses a removable storage device with exchangeable memory chips, and therefore can replace or expand the memory chips in the removable storage device, so as to change the memory capacity of the removable storage device, as well as to facilitate data storage. However, the patent application merely discloses an attachment apparatus for the memory chips and a removable storage device utilizing the attachment apparatus. Such removable storage device may not function properly or may lose the existing data while replacing the chips, and thus may jeopardize the user's data safety. Accordingly, the application of such removable storage device is rather limited.

SUMMARY OF THE INVENTION

In consideration of the drawbacks of the removable storage device in the prior art and for the purpose of data storage security, a method for data managing in a removable storage device is provided in order to have the removable storage device work properly after the chips are replaced, and to improve data security as well.

In order to achieve the object described above, a method for managing data in a removable storage device having replaceable memory chips is provided, said method comprises: applying or organizing or establishing or re-building the file managing system of the storage medium of the removable storage device according to the uses of said memory chips; and utilizing the file managing system to perform the corresponding processing in the memory chips according to the operation instructions of the host system, which is connected with the removable storage device.

The host system may produce one or more disk descriptors of the removable storage device according to information of the memory chips of the removable storage device.

The uses of certain memory chip refer to the condition wherein the controller of the removable storage device reads the amount of the memory chips within the removable storage device, and acquires information of the memory capacity of each memory chip.

The removable storage device comprises: a host interface for connecting the removable storage device to the host system; a controller for controlling the operation of the removable storage device; an attachment apparatus for memory chip, which is attached with at least one memory chip in a detachable manner, the memory chip electrically connected with the host interface and the controller by the attachment apparatus for memory chip, and reading and writing data under the control of the controller.

The memory chips according to the present invention may include semiconductor memory chips, including Flash Memory, DRAM, EEPROM, SRAM, SDRAM, FRAM, MRAM etc.; the memory chips may be memory chips that have been used, i.e. the memory chip that has been initialized or partitioned or accessed; meanwhile, the memory chips may also be unused memory chips, that is, the original chips shipped from the chip manufacturers that have never been used.

The types of the file management system may include but are not limited to FAT12, VFAT, FAT16, FAT32, CDFS, NTFS or other file management system and their updated versions used in Windows OS; and EXT2, EXT3, JFFS, NFS, RAMFS, HPFS, CRAMFS or other file management system and their updated versions used in UNIX or LINUX.

With the method for managing data in a removable storage device as provided in the present invention, the capacity of the removable storage device can be expanded, and the storage medium can be replaced or updated. Also, the removable storage device chips can be utilized to store data, and thus the function and convenience of the removable storage device are improved, thereby facilitating the operation of the removable storage device, the data security and the ease for using the system.

DETAILED DESCRIPTION OF THE INVENTION

The spirit and nature of the invention would be better understood by those skilled in the art according to the following detailed description of embodiments of the invention with reference to the accompanying drawings.

Figure 1:
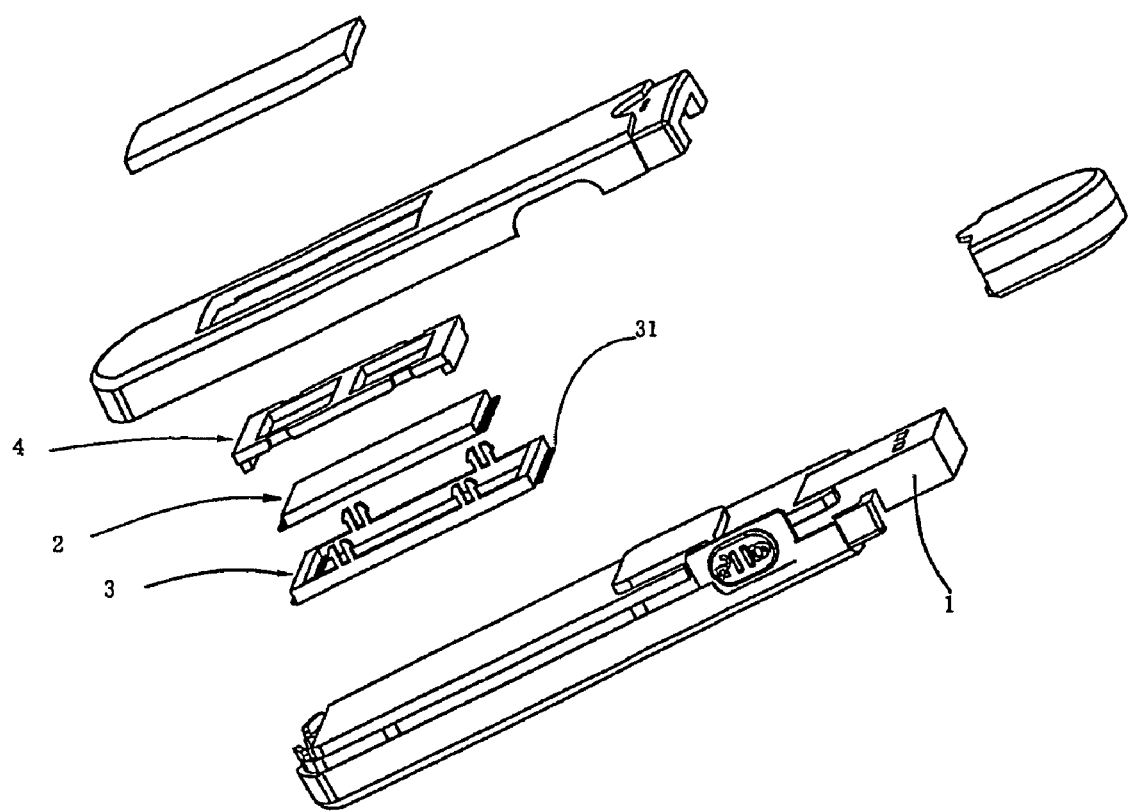
FIG. 1 depicts the configuration of the removable storage device with detachable storage medium in accordance with the present invention.

With reference to FIG. 1, the invention is applicable to a removable storage device with detachable and replaceable storage medium. The removable storage device comprises a host interface 1, a controller (not shown) and a storage medium encapsulated in a memory chip 2, and also comprises an attachment apparatus. The memory chip is attached in the attachment apparatus in a detachable manner. The attachment apparatus includes a base 3 and an upper cover 4, the base 3 provided with an elastic member 31 for providing electrical connection. The elastic electrically connecting member 31 is electrically connected to the memory chip 2 provided in the base 3, the host connector 1 outside the base 3, and the controller. The elastic electrically connecting member 31 tightly presses the memory chip 2 in a detachable manner.

The attachment apparatus of the removable storage device used in the present invention may accommodate two or more memory chips 2. The connecting member 31 provided on the base 3 of the attachment apparatus may be electrically connected to the pins of each memory chip 2, the connecting member 31 is also provided with chip selection pins which correspond to each memory chip 2 respectively. The chip selection pins are connected to the corresponding chip selection pins of each memory chip 2 respectively, and other pins are connected to other pins of the memory chip 2.

The initialization process of chip 2 by the removable storage device after the memory chip 2 is loaded in the removable storage device will be described.

According to the technical standard of current operation system, file managing system (take common FAT table as an example) is an important tool to manage the memory space, and the manipulation of data file in the memory space by the operation system should be dependent on the FAT table. The table records the using and distributing status of each cluster and storage addresses of disk data, and each file is provided with a set of connected FAT link to designate their cluster addresses. The damage of FAT table would result in the missing of files and data content.

According to the current technique and standard of semiconductor storage, all bits in the memory space of an unused memory chip are logical "1" without any data information, while there are data and FAT table in used memory chips, the memory space of which is not all logical "1". Obviously, there are not all logical "1" in the logical "0" block. According to the difference, whether the memory chips have been used could be judged by reading the information in logical "0" of the memory chips.

In the removable storage device of the present invention, a plurality of memory chips may be loaded into the removable storage device at one time, or the chips may be piled on the existing chips. Alternatively, the attachment apparatus for memory chip may be provided in addition to the existing removable storage device so as to add and/or replace memory chips through the attachment apparatus for memory chip. The so-called existing removable storage device refers to the removable storage device with part of memory chips are fixed and are not detachable.

The memory chip installed by the user would be checked by the removable storage device to determine whether it is a used chip, i.e., the chip that has not been initialized or partitioned. If the chip is a blank chip that has never been used, the chip will be formatted by the removable storage device and will be written with FAT table. If the chip is a used chip and has a FAT table, the chip does not need to be formatted and may be ready for use instantly.

In case two or more chips including a used chip are loaded into the removable storage device at one time, all the chips will be sorted and processed by the removable storage device, and then will be initialized collectively to combine the FAT table information in the used chips and produce a FAT table for managing memory spaces of all the memory chips. For the purpose of normal usage, the memory chips loaded in the removable storage device are organized and managed collectively by the FAT table.

In order to protect the useful data in the used chip, the FAT table of used chip in a plurality of chips should be combined, modified or rearranged so that the FAT table can manage the data inside the entire storage device and ensure the security of data files as well.

The detailed initializing process is as follows:

N used chips and M unused chips are loaded into the removable storage device, then the removable storage device is connected with a host. The controller of the removable storage device reads all the IDs of the memory chips loaded in the removable storage device automatically after being powered on through the host, determines the amount of memory chips, and acquires the capacity of all the memory chips.

Then, the chips are sorted by the controller. The detailed process is as follows: the controller reads the logical "0" block of each chip sequentially according to the order of the ID of the chips or the order of chip selection until it encounters the first chip in which the logical "0" block is not all logical "1" (i.e., the used chip), and regard it as the chip with a physical address of 0. N chips with logical "0" block that is not all logical "1" will be found with the same method as above, then regard them in turn as the first chip of physical address, the second chip of physical address . . . the Nth chip of physical address. The logical "0" block is the starting block when compiling the logical addresses for the memory chip, namely the first block of the logical address. The FAT table and the comparison table should be written into this block according to the present operation system and disk management standard.

Then, the controller compiles the remaining M chips (i.e. the unused chips) with the logical "0" block are all logical "1" as the N+1th chip of physical address, the N+2th chip of physical address . . . the N+Mth chip of physical address.

Till now, the sorting of chips has been finished. The physical addresses of chips that have been sorted according to above order start from 0 chip through the N+Mth chip of physical address. The overall memory space of the removable storage device is the sum of the memory spaces of all chips.

Then, the controller arranges and rearranges the file information of the N used chips, and changes their addresses. The addresses are changed according to the above-mentioned sorting method of the memory chip. The information managing principle of data files is on the basis of the managing method of FAT file system, and the FAT file system that could be recognized by the host system is reproduced according to the results of the change in actual storage addresses (that is, the relative addresses of the physical storage area of N used chips have been changed because of the sorting), the overall memory spaces and new addresses information of all the data file are combined into a new FAT table, which is written into memory chips according to the default address of controller (the default address is decided by the sorting result of memory chips, the method and principles of combination are the managing method of FAT file system).

If N is 0, that is, the chips installed in the removable storage device are all unused chips, and the controller of the removable storage device does not have to change the file address after the sorting is finished, and thus organize the memory spaces and write it into the FAT table directly.

Each time the user changes the memory chip of removable storage device, for example the chips are added, replaced or removed, the controller should conduct the initialization procedure described above with respect to all the memory chips installed into the removable storage device.

In the following, the procedure of manipulating the memory chips by the removable storage device would be described with reference to the removable storage device provided with two memory chips.

In the current embodiment, the removable storage device is provided with two memory chips, wherein the first chip uses flash memory chip with 64M capacity, and the second chip uses flash memory chip with 128M capacity. The first chip and the second chip are attached in the attachment apparatus in turn. The host connector in accordance with the present embodiment uses a universal interface that matches the USB standard, and is connected to the host and transfers data through the standard USB interface.

The memory space is divided into a plurality of storage block according Each storage block is divided into a plurality of pages, which include the area that stores the information of addresses, the logical address of the storage block corresponding to the information of addresses in the comparison table. The corresponding designated logical address (referred to as designated logical address thereafter) may be generated by changing the addresses according to the designated address in the data manipulation instruction. The comparison table is referred to according to the designated logical address, then the logical addresses corresponding to the designated logical addresses are found, and the physical addresses corresponding to the logical addresses are found, thus the designated storage block will be found from the storage medium. The current address transformation method may be utilized in the operation of transformation of designated addresses described above.

In the present embodiment, the memory space of removable storage device is composed of the first chip and the second chip having different storage capacity. After the initialization procedure, the first chip becomes chip 0 of physical address of the memory space, the second chip becomes the first chip of physical address of the memory space, and the physical addresses of the memory space of the chips are continuous. The physical address of the first chip set 0 as the starting address, and 63 as the ending address; while the second chip set 64 as the starting address, and 191 as the ending address.

According to the operation instructions from the host, the removable storage device of the embodiment selects and addresses the chips in accordance with the storage capacity of each chip. The process of instruction addressing and chip selecting is as follows:

The designated address in the data manipulation instruction is read, and is transform into physical address, and then the obtained physical address is compared with the storage capacity of the first chip.

If the physical address does not exceed the capacity of the first chip, the designated physical address is within the first chip, thus the corresponding storage block should be found in the first chip. If the physical address exceeds the capacity of the first chip, the designated physical address may be within the second chip. Here, the obtained physical address should be compared with the sum of the capacity of the first chip and the second chip, and if the physical address exceed the sum of the capacity of the first chip and the second chip, the designated physical address exceed the range of the memory space, thus the controller returns error information. If the physical address does not exceed the sum of the capacity of the first chip and the second chip, then the designated physical address is within the second chip, here the corresponding storage block should be found in the second chip according to the designated physical address.

If there are N chips that are mounted in the removable storage device, the addressing method is similar to the steps described above, that is, the designated physical address is compared with the cumulative value of the capacity from the first chip through the Nth chip until the chip with the designated physical address is found. If the overall capacity of all the chips is less than the designated physical address, the designated physical address exceed the range and the controller returns error information.

The removable storage device of the present embodiment may have identity authentication scheme, which may realize the access control for the host and access control for the removable storage device. The identity authentication is needed for the above two types of access control. User may set the identity authentication, in which the setting items may include enable/disable identity authentication scheme, user name and password, access authority, setting authority of identity authentication scheme etc. The removable storage device performs the access control on the basis of the identity authentication scheme.

The removable storage device in the present embodiment also supports multi-user operation. Multiple users are distinguished from each other using user names, and each user may have a virtual memory space. The virtual memory space may be hidden or open to other users, and the volume of the virtual memory space may vary. The multi-user strategy may be realized using current techniques, for example, through the technique of the flash disk encryption. In general, the controller splits the continuous memory capacity of the memory chip into a plurality of storage blocks with certain capacity according to the requirement of different users so as to allocate a memory disk with certain capacity to each user. For these users, the operable space is the allocated virtual space and the common storage space provided with certain access password.

Figure 2:
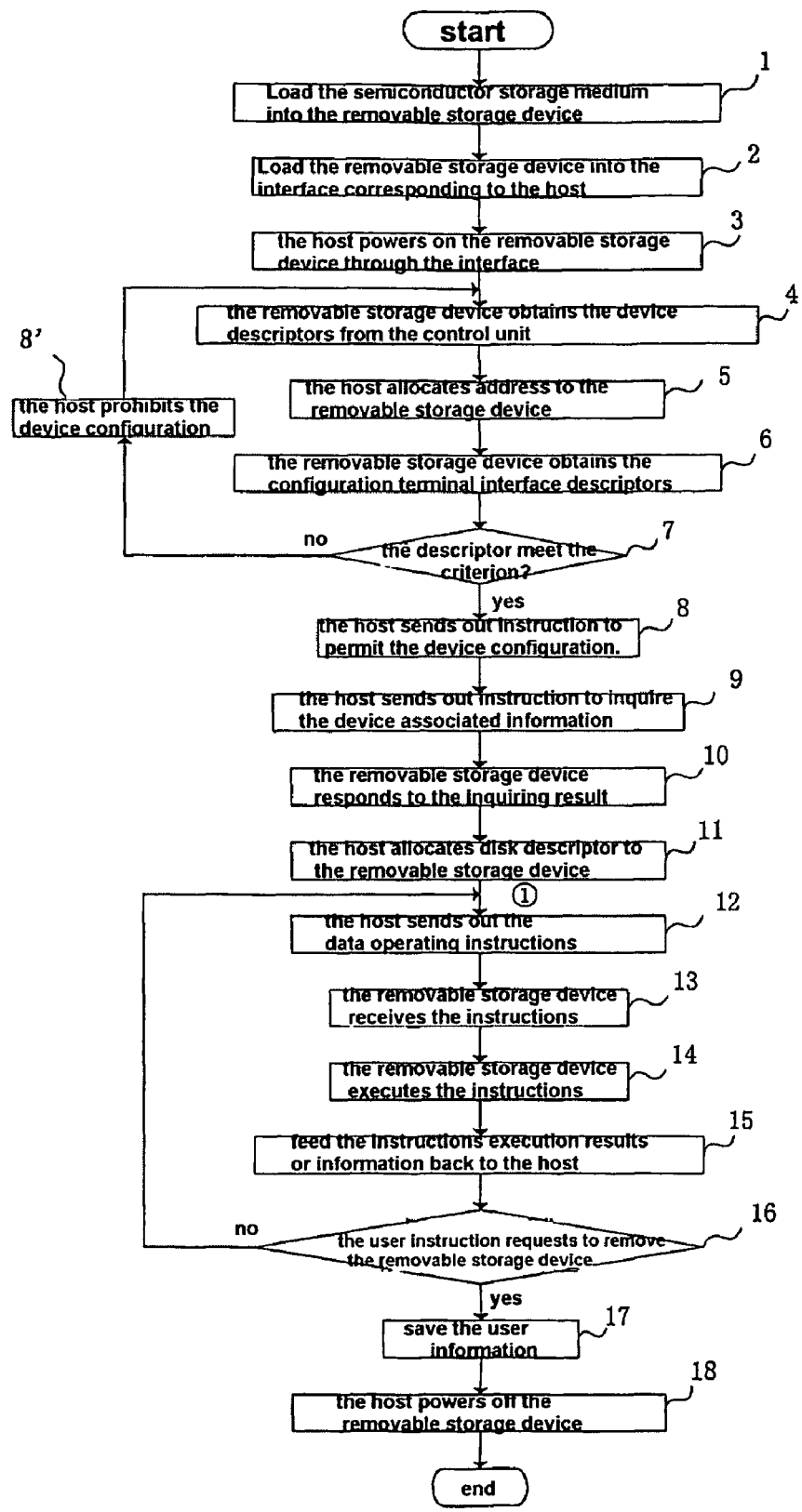
FIG. 2 is a flowchart of an embodiment of the invention that realizes the connection of the removable storage device to the host and data manipulation.

FIG. 2 shows the procedure of connection and the data manipulation of said the above-mentioned removable storage device with the host in the present embodiment.

According to FIG. 2, in step 1, the first chip and the second chip are sequentially loaded into the attachment apparatus of the removable storage device, and thus establishing the electrical connection between the storage medium and the host connector, controller, etc. of the removable storage device. Then, the removable storage device is connected to the corresponding interface of the host through the host connector (step 2). When the corresponding interface of the host detects the connected device, the host will supply power to the connected removable storage device (step 3).

Then, the host sends out inquiring instruction to the removable storage device to inquire the descriptor of the removable storage device. The removable storage device obtains the device descriptor from the controller according to the inquiring instruction. The device descriptor includes tags showing that the removable storage device allows a plurality of disk descriptors. The removable storage device returns the device instruction descriptor to the host (step 4). Upon receiving the descriptor, the host allocates address for the removable storage device (step 5).

After that, the host sends out inquiring instruction again to inquire configuration, terminal, and interface descriptors, the removable storage device obtain the descriptors according to the inquiring instruction, and return them to the host (step 6). The descriptors include the information of maximum supported logic unit (LUN), which is a symbol showing how many disk descriptors should be generated. The host checks whether the returned descriptors meet the criterion (step 7). If the descriptors does not meet the criterion, the host prohibits the configuration for the device. The inquiring instruction is sent out again before return to the first inquiring descriptors (step 8). If the descriptors received in the third time still don't meet the criterion, the inquiry will be stopped, and the device configuration will be terminated.

If the descriptors meet the criterion, the host sends out instruction allowing the configuration for the device to the removable storage device (step 8). A series of configuration operations of removable storage device will be conducted.

The host sends out instruction to inquire the device associated information (step 9), which may include the equipment manufacturer, the product name, the storage capacity, and so on, to start corresponding equipment driver, to select interface, terminal (pipe), to determine the transmission mode. The removable storage device responds to the inquiring instruction and feeds back the above information (step 10). The host allocates one or more disk descriptors for the removable storage device according to the requirement thereof (step 11). Till now, the process in which the host recognizes and configures the removable storage device is finished. The number of the disk descriptors of the removable storage device in the present invention can be equal to the amount of memory chips loaded in the removable storage device. Also, the memory chips can be divided into a plurality of different partitions so as to make the number of the disk descriptors of the removable storage device equal to the number of the partitions.

Then the host receives the user's instructions to the removable storage device, and sends the instructions to the removable storage device (step 12). After the controller of the removable storage device receives the instructions (step 13), the instructions are explained and executed (step 14). The instruction execution results, system information, operation data, etc. are fed back to the host (step 15). The above operation is repeated to execute user's instructions until the user sends out instruction to remove the removable storage device (step 16).

Figure 3:
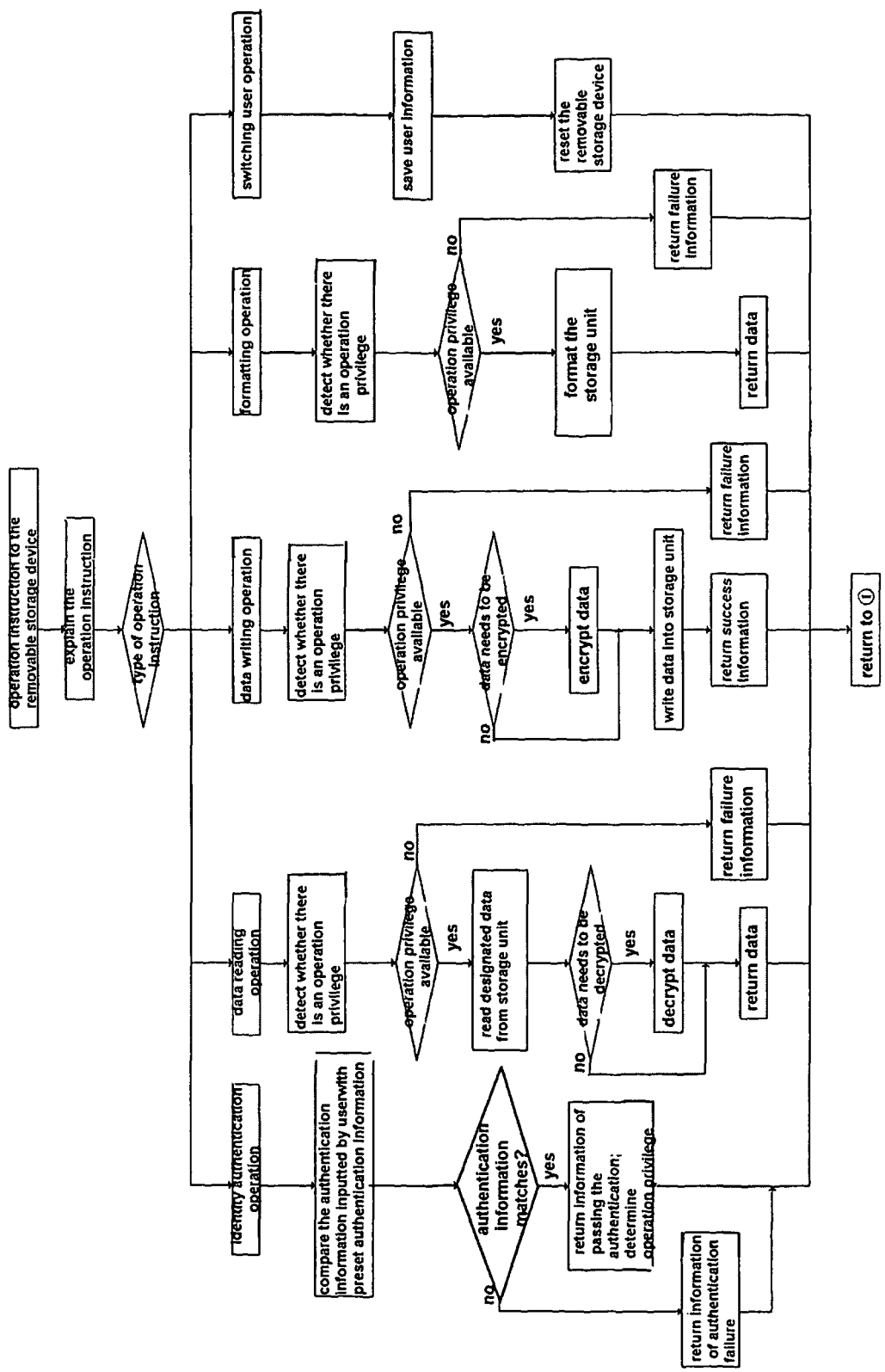
FIG. 3 is a schematic flowchart for implementing the method of data manipulation of the removable storage device in accordance with the present invention.

After receiving the instruction to remove the removable storage device, the host saves the user information (step 17), completes all operation tasks of the user, powers off the removable storage device (step 18). Now the removable storage device is disconnected from the host, and the entire process is finished. In the above process, the basic instructions to the removable storage device include writing data, reading data, the operation of formatting, the operation of switching user and identity authentication etc. Depending on the types of the operation, the removable storage device may perform different execution processes. FIG. 3 shows the detailed execution process of data operation, which is described as follow:

With respect to the identity authentication, the host requests the user to input the authentication information, and transmits the information to the removable storage device. The removable storage device compares the authentication information with the authentication information pre-stored in the storage medium. If they match each other, the user's operation privilege to the removable storage device is determined, and the success authentication information is returned to the host. If they don't match each other, then failure information is sent to the host. The process goes back to the □ in the FIG. 2, and the removable storage device waits for the next instruction from the host.

For example, according to the setting of the identity authentication, the user has to be subject to the identity authentication through the removable storage device before operating the host. Before the user operates the host, the host requests the user to input the use name, password and other identification information in a pop-up dialog box. The authentication information is packaged and sent to the interface connector of the host of the removable storage device according to the interface criterion through the corresponding interface of the host, and the host interface connector then sends the data to the controller of the removable storage device after receiving the data. The controller compares the authentication information with the authentication information pre-set or pre-stored in the storage medium. If they match each other, the controller determines the user's operation privilege to the host according to the identity authentication scheme (for example, read only, read & write, format, setting privilege of identity authentication etc.), and makes tag and returns success information. If they don't match each other, the failure information is sent back to the host. The failure information is sent back to the corresponding interface of the host through the host connector, and then sent to the user by the host. After the authentication process is finished, the removable storage device waits for the next instruction from the host.

With respect to the case that the user has to pass the identity authentication before operating the removable storage device, the process is similar to the above mentioned one, the description thereof is omitted herein.

With respect to the instruction to read data, for example, the user needs to read specified data from a specified memory chip, the controller of the removable storage device first checks the operation privilege of the user, determining whether the user has the operation privilege to read the memory medium. If the user does not have the operation privilege to read, the failure information is sent back to the host. The process returns to the □ of the FIG. 2, and the removable storage device waits for the next instruction from the host. If the user has the operation privilege to read, the specified data will be read from the specified storage medium. According to the user's settings, it is determined whether the data is encrypted and needs to be decrypted. If the data needs to be decrypted, the controller of the removable storage device calls for the decryption strategy to decrypt the data, and then sends the data to the host. If the data does not need to be decrypted, the data is sent to the host directly.

Of course, if there is no encryption strategy in the removable storage device, the decryption or encryption process is not needed when reading the data.

With respect to the instruction to write data, for example, the user needs to write the specified data into the specified storage medium of the removable storage device, the process of the instruction is similar to that of the reading instruction, that is, the controller of the removable storage device first, check the operation privilege of the user, determining whether the user has the operation privilege to write in the memory medium. If the user does not have the operation privilege to write, the failure information is sent back to the host. The process returns to the □ in FIG. 2, and the removable storage device waits for the next instruction from the host. If the user has the operation privilege to write, it is decided whether the data needs to be encrypted according to the settings of the identity authentication scheme. If the data needs to be encrypted, the controller of the removable storage device calls for the decryption strategy to encrypt the data, writes the data into the storage medium, and then sends back successful write information to the host. If the data does not need to be encrypted, the data is written into the storage medium directly, and the successful write message is sent back to the host.

Similarly, if there is no encryption strategy in the removable storage device, the encryption process is not needed when writing the data.

With respect to the format operation instruction, the controller of the removable storage device will also first check the operation privilege of the user to determine whether the user is authorized to format the storage medium of the removable storage device. If the user is not assigned the operation privilege, the operation failure information is sent back to the host. The operation procedure returns to ☐ in FIG. 2, and the removable storage device waits for the host to send operation instruction. If the user is provided with the operation privilege, the storage medium will be formatted, and then successful format information is returned to the host.

The user switching operation should be performed when the removable storage device is switched among a plurality of users. The detailed process is as follows: the host receives the exit instruction from the user and transmits the instruction to the removable storage device, the removable storage device saves information of the current user, and then the host reset the removable storage device, after that the operation process returns to ☐ in FIG. 2, and the removable storage device continues to wait for the host to send operation instruction. The removable storage device can be accessed only after the next user finishes the operation of identity authentication.

On the basis of the method described above, the removable storage device may be improved. Also, the application thereof may be expanded, for example, the user may designate the number of disk descriptors for the removable storage device, the specific descriptor for each disk descriptor, and the symbols of the disk descriptors. The setting of the corresponding relationship between the data, symbol of the disk descriptor and the storage medium as well as the setting of disk descriptors may be realized by software of the current technique.

In accordance with the present invention, the user may set the encrypted data area in each memory chip or disk descriptor and designate the size of the encrypted data area. The user may further set an encryption policy for the encrypted data area of the memory chip or the disk descriptor respectively. The detailed method will be described later. For the memory chips provided with encrypted data area, the unencrypted data can only be stored in the unencrypted data area, while all data stored in the encryption data area should have been encrypted with the encryption policy. Also, such data has to be decrypted with the encryption policy before it can be read.

When the data in the memory space corresponding to the memory chips or disk descriptors is manipulated, the controller of the removable storage device will decide whether the encryption and decryption are needed for the data operation according to the setting of the encryption data area and the addresses designated by the instruction. For data that needs to be encrypted/decrypted, the removable storage device will perform the data encryption and decryption respectively according to the configuration described above; for data that does not need to be encrypted/decrypted, the data is operated with the conventional data operation method.

The detailed method to set the encryption data area for the memory chips and to modify the size of the encryption data area is as follows: the controller sets a plurality of information bits in the memory chip according the choice of the host system, such information bits being used to indicate whether there is an encrypted data area in the memory chip and its size. The controller would know whether there is an encrypted data area and its size according to above information bits. The starting address of the encryption data area is specified by the controller according to the predetermined settings. If user needs to modify the setting of the encrypted data area, e.g., canceling the encryption data area, modifying the size of the encryption data area, etc., an instruction may simply be sent out, and the contents of the information bits can be modified by the controller.

Figures 4, 5:
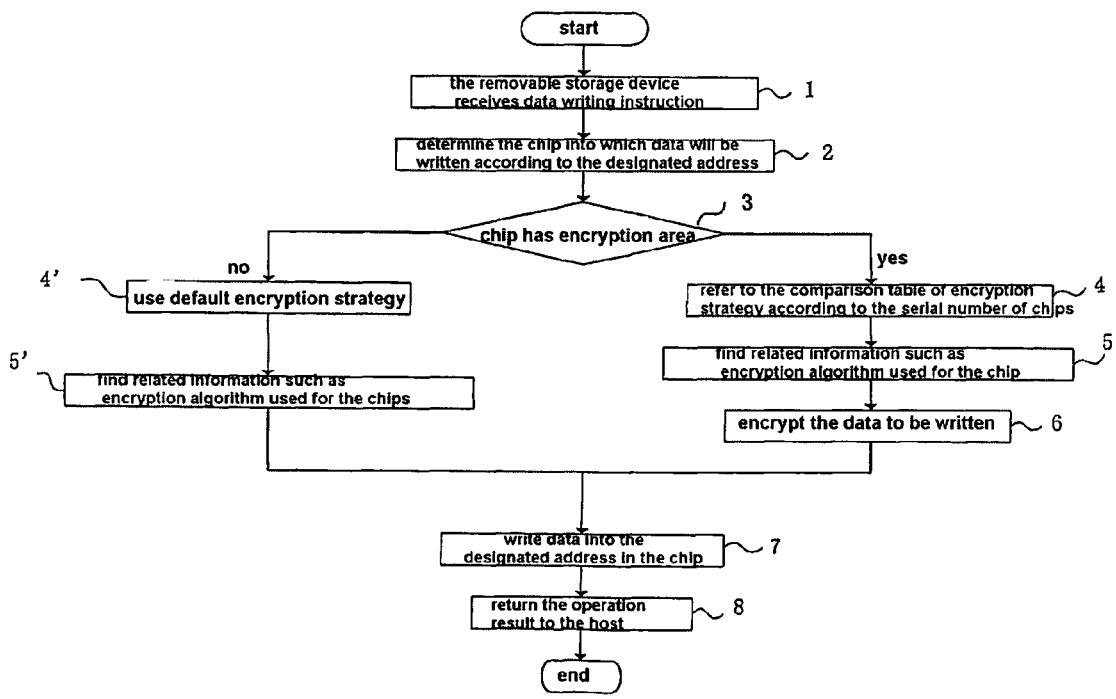
FIG. 4 is a schematic view of encryption strategy of the memory chips in accordance with the present invention.
FIG. 5 is a schematic flowchart of data manipulation of the encrypted data area of memory chips.

The detailed method for data operation to the encryption data area of the memory chips is as follows:

FIG. 4 is a comparison table for setting the encryption strategy for the memory chips in a removable storage device. This comparison table includes items such as serial number, encryption strategy, wherein the encryption strategy includes encryption algorithm, encryption key and other information. In this table, each memory chip or disk descriptor that needs encryption/decryption corresponds to an encryption strategy and the information associated with the encryption strategy. The user may use software to load encryption strategy into the removable storage device, and specify which storage chips the encryption strategy is to be applied to in this comparison table. If the user does not specify encryption strategy to the encryption data area in the memory chips, then removable storage device will adopt the default encryption strategy to perform the encryption or decryption process to the encryption data area. It is to be understood that this is only for the encryption data area, while the non-encryption data area is not to be encrypted.

FIG. 5 shows the flowchart of the data operation to the encryption data area. Referring to the flowchart in FIG. 2 and FIG. 3 at the same time, after the removable storage device receives data operation instruction, the controller analyses whether the data operation instruction is reading instruction or writing instruction. According to the above mentioned instruction addressing process, it is determined which storage chip the designated address resides, and then the encryption strategy comparison table is referred to according to the serial number of the storage chip. If the serial number of the storage chip cannot be found in the comparison table, it means that the user merely sets the encryption area for the chip, but does not specify the encryption strategy. At this time the controller adopts the default encryption strategy, using the encryption algorithm pre-stored in the removable storage device to perform the encryption or decryption during the reading or writing procedure. If the serial number of the storage chip is found, it means that the user specifies the encryption strategy solely to the chip, and then the controller finds the pre-stored encryption algorithm in the removable storage device according to the encryption strategy to perform the encryption or decryption process during the reading or writing procedure.

After finishing the above operation, the controller will return the system information to the host according to the status of the operation.

Setting encryption data area and its encryption strategy for the disk descriptor is actually setting encryption data area and its encryption strategy for one or more memory chips corresponding to the disk descriptor. So when the user sets the encryption data area and its encryption strategy to a certain disk descriptor, the controller only needs to convert the encryption data area and its encryption strategy for the disk descriptor to the settings for the respective memory chip according to the corresponding relationship between the disk descriptors and the memory chips. During the data operation, the data operation instructions for the disk descriptor are divided into the data operation instructions for the respective memory chips, and then the encryption or decryption is performed during the reading or writing procedure by adopting the above mentioned method by which the data operation is performed in one storage chip with an encryption data area.

The above is the description for one embodiment of the present invention. The embodiment may realize the connection, recognition, configuration, and data operation between a removable storage device having a detachable/replaceable storage medium and a host, and also can perform the encryption or decryption process to the data in each memory chip or disk descriptor respectively according to the encryption strategy. In addition, the embodiment is capable of performing identity authentication and access privilege control for a user who intends to access the host and the removable storage device according to an identity authentication scheme.

However, such embodiment may have certain disadvantages. In other words, if a user needs to replace, remove, or add the memory chips during the using process, according to the nowadays techniques, the user has to send instruction to remove the removable storage device. After the host stops to supply electricity to the removable storage device, the removable storage device is removed from the interface of the host, and then reconnected to the interface of the host after the memory chips are reinserted, thereby restarting the connection, recognition, and configuration with the host. Such complicated operation is inconvenient for the users to use removable storage device. In addition, if the user removes the removable storage device before the host is powered off, the removable storage device may be damaged.

Figure 6:
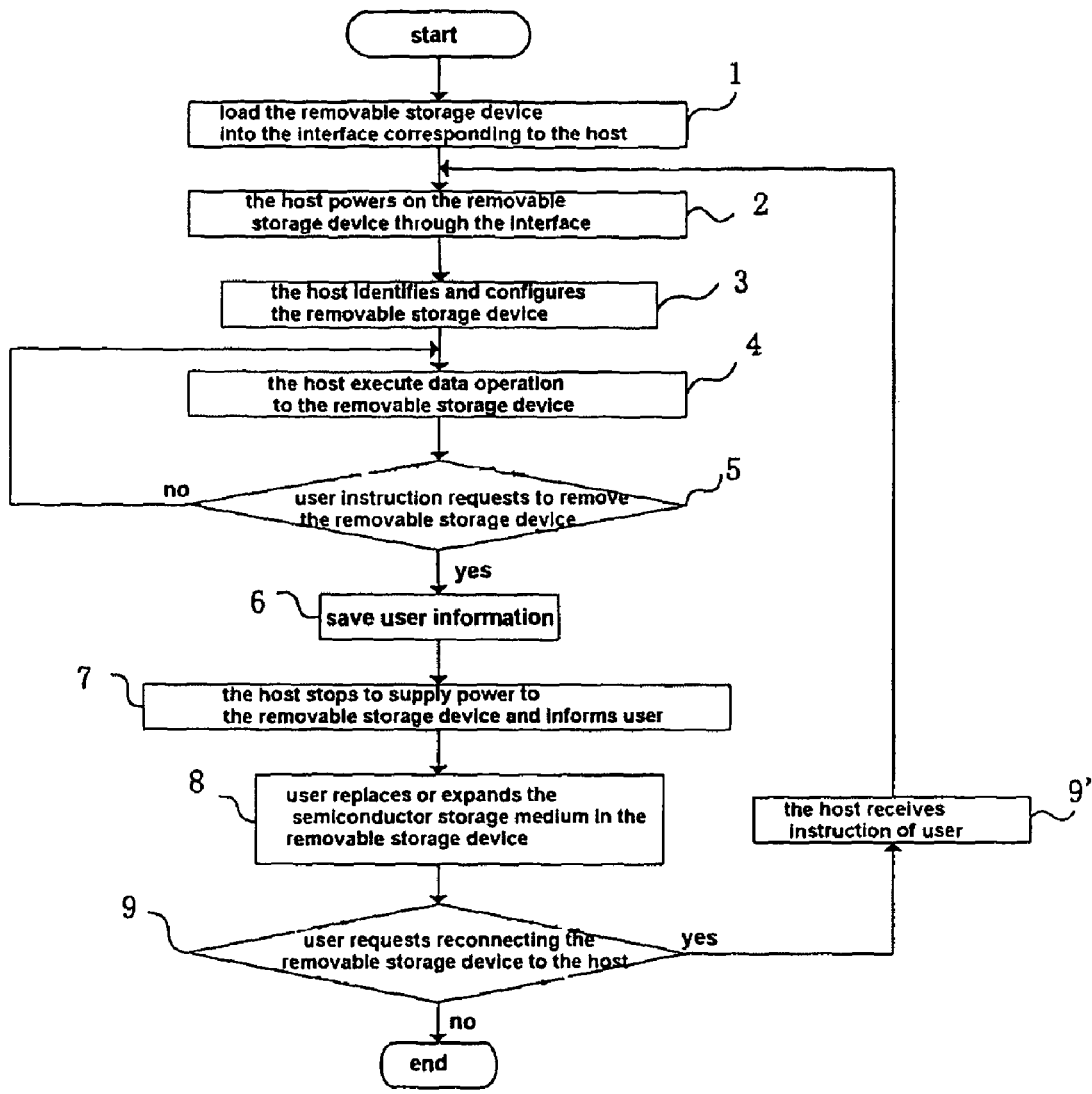
FIG. 6 is a flowchart of a method to remove the storage medium with the interfaces of the removable storage device and the host being connected in accordance with the present invention.

In consideration of the above problem, another embodiment is proposed in order to achieve such objective, that is, the memory chips can be removed with the removable storage device being connected with the host. The connector of the host of the removable storage device uses the universal interface that is in compliance with the USB standard, and connects the host and transfers data with the host through standard USB interface. FIG. 6 shows its flowchart.

Referring to FIG. 2, after the user inserts the removable storage device into the corresponding interface of the host, the corresponding interface of the host detects the newly connected device, supplies the removable storage device with electricity through the interface, and then performs the connection, recognition, and configuration for the removable storage device. When the configuration is finished, the host sends the user's operating instructions to the removable storage device to perform the data operation. When the user sends an instruction to request the removal/installation of the memory chips, after the host receives the instruction, it ends all the tasks of the user, saves the user information, and then stops to supply electrical power to the controller of the removable storage device. The above process is similar to the flowchart as shown in FIG. 2.

After the host stops to supply electrical power to the controller of the removable storage device, the host sends message back to the user, suggesting that the user may safely remove/install the memory chips out of/into the removable storage device. The user can remove and replace the memory chips without disconnecting the removable storage device out of the interface of the host. After the memory chips are removed and replaced, the user sends an instruction again to inform the host to reconnect the removable storage device. After the host receives the instruction, the process returns to Step 1 in FIG. 6, and the electricity is supplied again to the removable storage device through the corresponding interface to re-perform the process of connection, recognition, and configuration. Hence, the present method solves the problem caused by the inconvenience of repeatedly connecting and disconnecting operation to the removable storage device, and the problem that the removable storage device may be damaged when it is inserted in or pulled out with the power being on. Also, this method expands the application of the removable storage device, and increases the safety of the data and the convenience of the device.

In the above embodiment, the user may send the instruction to remove, reinstall the removable storage device by means of software. Alternatively, this may be realized by using a switch. The switch may be provided on the removable storage device, and be connected to the power supply of the removable storage device. After the host cuts off the electricity of the controller of the removable storage device, the host and the interface of the removable storage device are in a standby status for electricity supply. The user sends the installation signal of the removable storage device through the switch on the removable storage device. The simple way is that, the switch directly controls the electrical power supply supplied by the USB interface of the host that is connected with the removable storage device. When the memory chip is being installed, the electrical power is turned off; when the installation is finished, the electrical power is turned on. When the next time the host inquires if there is a device connected to the certain interface, the response is positive. Therefore, it is realized that the instruction of reinstalling the removable storage device is sent by manual switch.

While the present invention has been shown and described with reference to exemplary embodiments thereof, it will be understood by those of ordinary skill in the art, the implementation of the removable storage device and the attachment apparatus within the removable storage device in the present invention is not exclusive. The operating process by which the host recognizes and configures the removable storage device is not exclusive either, and may be modified with the current techniques. Many kinds of current techniques may be used for allocating physical addresses, setting multiple disk descriptors for a plurality of memory chips, or setting the encryption policy and identity authentication for each memory chip or disk descriptor according to the user's requirement. Various changes made to the embodiments of the present invention without departing from the spirit of the present invention will be included in the scope defined by the claims of the present invention.

The invention claimed is:

1. A data managing method for a removable storage device having a replaceable memory chips, said replaceable memory chips including used memory chips and/or unused memory chips, the used memory chips being chips having a file management system and ready to be used in the removable storage device, the unused memory chips being chips that have not been initialized or partitioned, characterized in that said method comprises the steps of:
   1) determining whether the replaceable memory chips:
      a) are used memory chips; or
      b) are unused memory chips; or
      c) include both used and unused memory chips
   2) a controller of the removable storage device reading an amount of the replaceable memory chips installed in the removable storage device, and obtaining information of storage capacity of each of said replaceable memory chips;
   3) applying or organizing or establishing or re-establishing a file managing system for the replaceable memory chips of said removable storage device based upon the file management system of the replaceable memory chips; and
   4) utilizing said file managing system to perform corresponding processing in said replaceable memory chips according to an operation instruction from a host system connected to said removable storage device.

2. The data managing method according to claim 1, characterized in that the method further comprises:

said host system generating one or more disk descriptors for the removable storage device according to the information of replaceable memory chips of said removable storage device.

3. The data managing method according to claim 2, characterized in that the number of the disk descriptors of the removable storage device is equal to the number of the replaceable memory chips installed in the removable storage device.

4. The data managing method according to claim 2, characterized in that step 1) of the method further comprises:
dividing the replaceable memory chips of the removable storage device into a plurality of partitions, the number of the disk descriptors of the removable storage device being equal to the number of the partitions.

5. The data managing method according to claim 1, characterized in that step 1) of the method further comprises:
formatting the unused memory chips and establishing the file managing system with respect to unused memory chips; or
in the situation that there are only used memory chips, adopting the original file managing system thereof, or re-combining, modifying the file managing information and establishing a new file managing system.

6. The data managing method according to claim 5, characterized in that the method further comprises:
determining the used memory chips by reading the logical "0" blocks of the replaceable memory chips;
determining that the replaceable memory chips are used chips if no all logical "0" blocks are logical value "1", and
determining that the replaceable memory chips are unused chips if all logical "0" blocks are logical value "1".

7. The data managing method according to claim 1, characterized in that the method further comprises:
installing the replaceable memory chips in addition to existing memory chips which are fixed and not detachable.

8. The data managing method according to claim 1, characterized in that step 1) further comprises:
applying or organizing or establishing or re-establishing a file managing system including: FAT12, VFAT, FAT16, FAT32, CDFS, NTFS, EXT2, EXT3, JFFS, JFS, RAMFS, HPFS, and CRAMFS.

9. The data managing method according to claim 1, characterized in that performing a corresponding operation in the replaceable memory chips includes the steps of
reading a designated address in an operation instruction;
transforming the designated address into a physical address;
comparing the physical address with capacity of the replaceable memory chips;
determining a corresponding memory chip, and
finding a corresponding storage block in the determined memory chip.

10. The data managing method according to claim 9, characterized in that the method further includes:
the removable storage device returning error information if the physical address exceeds the storage capacity of all replaceable memory chips of the removable storage device.

11. The data managing method according to claim 1, characterized in that the method further includes:
the host system stopping to supply power to the removable storage device or the controller of the removable storage device when replacing the replaceable memory chips for the removable storage device.

12. The data managing method according to any of claims 1-6, further includes:
setting a data encryption area in the memory chips, and performing encryption or decryption to the stored data by the controller of the removable storage device.

* * * * *